April 30, 1929. J. R. CRAVATH ET AL 1,711,476
AUTOMOBILE SEAT
Filed Aug. 30, 1927  2 Sheets-Sheet 1

INVENTORS
James R. Cravath
Austin M. Cravath

April 30, 1929.    J. R. CRAVATH ET AL    1,711,476
AUTOMOBILE SEAT
Filed Aug. 30, 1927    2 Sheets-Sheet 2

INVENTORS
James R. Cravath
Austin M. Cravath

Patented Apr. 30, 1929.

1,711,476

UNITED STATES PATENT OFFICE.

JAMES R. CRAVATH AND AUSTIN M. CRAVATH, OF ALBANY, CALIFORNIA.

AUTOMOBILE SEAT.

Application filed August 30, 1927. Serial No. 216,384.

It has been recognized by various inventors that a considerable source of discomfort in automobile seats as heretofore commonly made and used has been due to the fact that the back of the seat does not move up and down in synchronism with the body of the passenger as the seat back is commonly attached rigidly to the car body and the passenger sits on a spring cushion which causes considerable up and down motion of the passenger's body with reference to the seat back on rough roads. The result is a rubbing action on the passenger's back which is decidedly unpleasant and is especially pronounced in recent models of seats in which the passenger is seated near the floor in a seat that is tilted back and in which the passenger naturally reclines more firmly against the seat back than in former practice. The common and increasing use of rough cloth upholstery for seat backs instead of the more slippery materials formerly used has further aggravated this source of discomfort.

As far as we are aware, most of the previous attempts to remedy this difficulty have employed a construction wherein the seat back and seat bottom are more or less rigidly fastened together as a unit and the principal seat springs are under this seat and back unit, various means being provided to guide this unit in a vertical motion to prevent rocking. When the whole seat moves up and down as a unit this plan can not be comfortably used on other than individual or single-passenger seats because the proper spring system for two or more passengers will not be comfortable for a single passenger as the spring system will be too stiff.

In our invention we may employ any desirable form of spring cushion or spring supported seat bottom. The seat back is spring supported independently of the seat bottom in vertical guides of low friction so that the seat back is free to move up and down with the backs of the passengers. In order that the seat back may oscillate up and down with a minimum of force transmitted through the passenger's back to the seat back, the spring supporting system of the seat back is so designed and selected that the natural period of up and down oscillation of the passenger on the springy seat bottom and the natural period of up and down oscillation of the seat back will be approximately equal.

Figure 1:
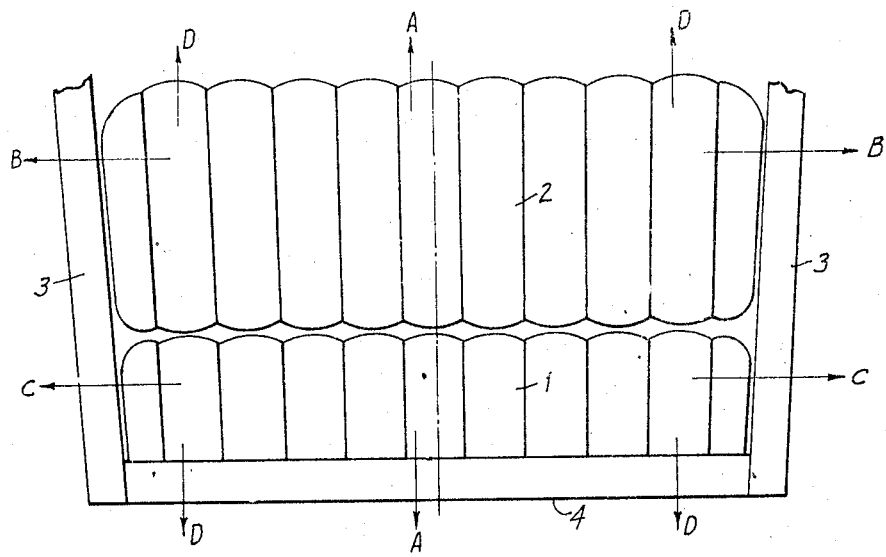
Figure 2:
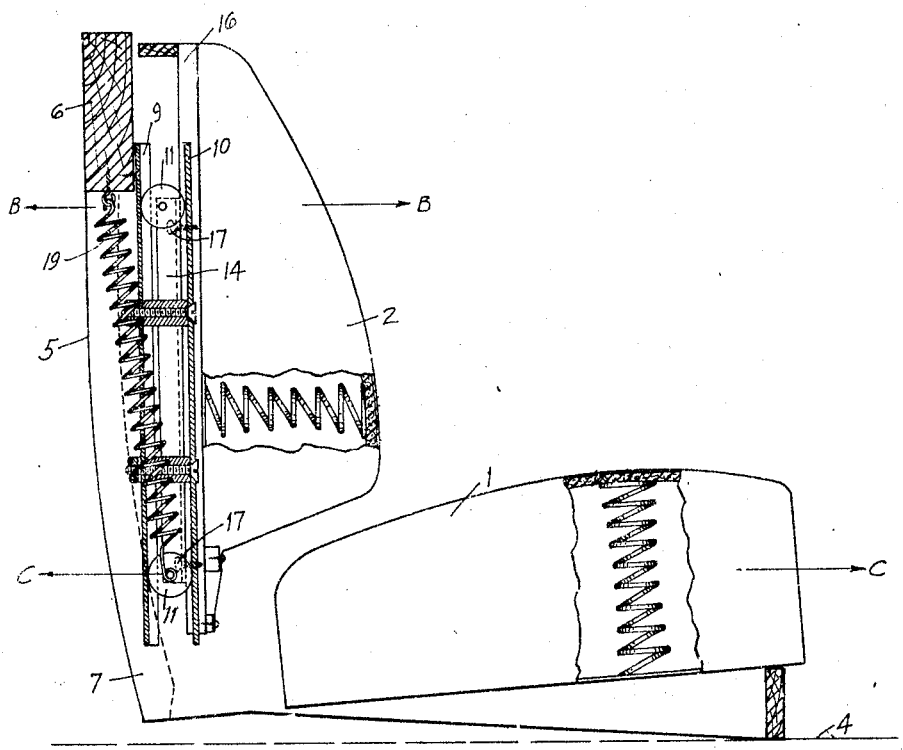
Figure 5:
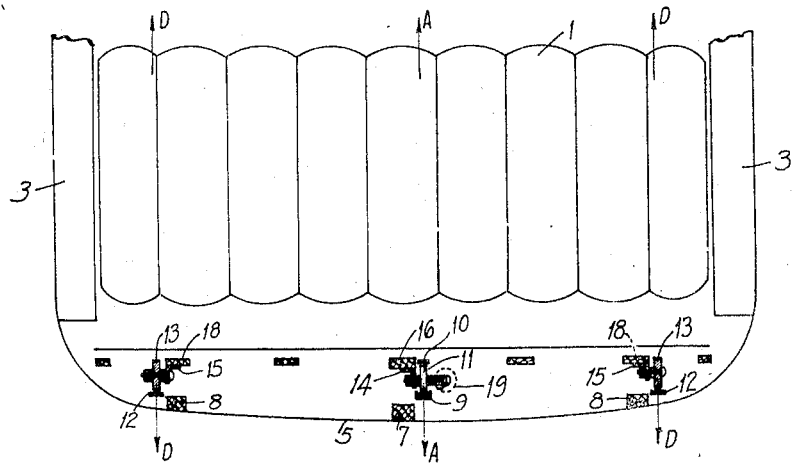
Figure 3:
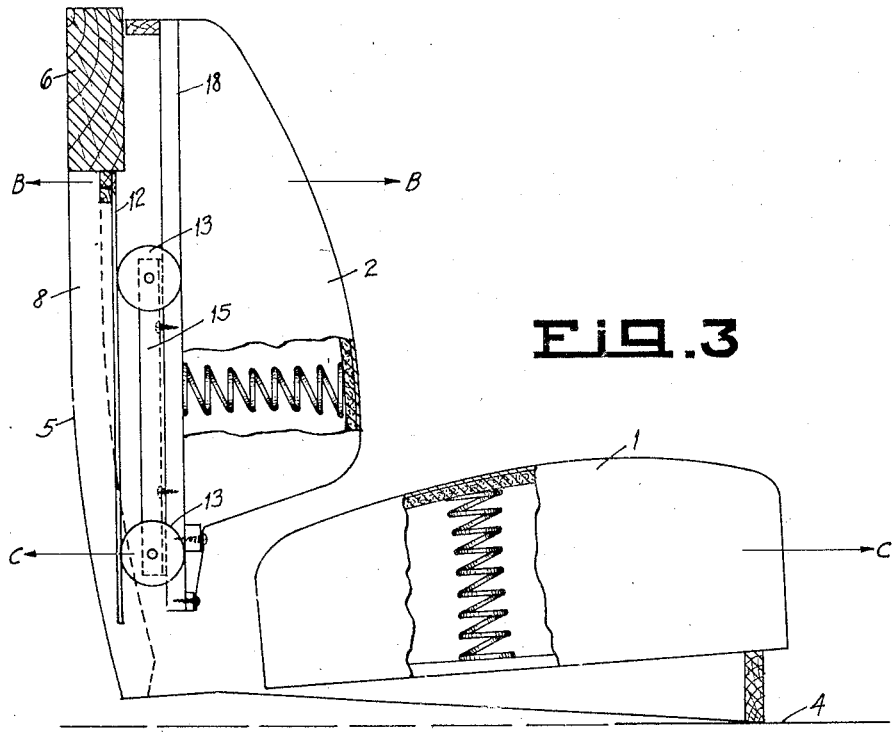
Figure 4:
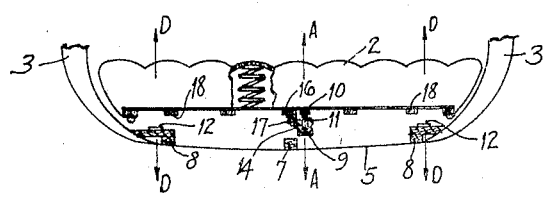

The accompanying drawings show one of our preferred forms of application of our invention. Fig. 1 is a view looking from front to rear of a seat constructed according to our invention. Fig. 2 is a sectional view on the line A A of Figs. 1, 4, and 5. Fig. 3 is a sectional view on the two lines D D of Figs. 1, 4 and 5. Fig. 4 is a sectional view on the line B B of Figs. 1, 2, and 3. Fig. 5 is a sectional view on line C C of Figs. 1, 2 and 3.

In these drawings 1 is any common form of spring seat cushion and 2 is a back cushion of ordinary form. Our invention relates particularly to the method of mounting and supporting this back cushion so that it is free to move up and down with the movement of the body of the passenger seated on the springy seat bottom. The sides of the car body are indicated by 3 and the car floor by 4. The metal back panel of the car is indicated by 5, a horizontal member of the wooden frame of the car 6 and the wooden ribs of the back panel by 7 and 8. The movement of the seat back cushion up and down is guided by the vertical channel iron 9, opposed by the flat track or guide 10, both of which are fastened to the car body. Between 9 and 10 are two ball bearing guide rollers 11 which are attached to the back cushion frame as hereinafter described. The distance between the guides 9 and 10 is adjusted to be just enough so that the rollers 11 can touch only one of these guides at once so that there is no rubbing of the rollers on the guides but only a rolling action as long as there is pressure of the passenger's back against the seat back. Two additional guide tracks 12 are provided on each side of the center against which roll four additional rollers 13. The four rollers 13 are fastened to the back cushion frame members 18 by two angle irons 15. The rollers 11 and 13 attached to the seat back frame act together with the guides 9, 10 and 12 to limit the motion of the back cushion to a substantially vertical plane with no sidewise motion. The two center rollers 11 are mounted on the angle iron 14 which is in turn attached to the middle vertical member of the seat back cushion frame 16 so that the rollers 11 are in effect mounted on and move up and down with the seat back cushion 2. To provide for ease of assembly the angle iron 14 is not permanently fastened to the back frame member 16. The two knobs 17 are fastened to the frame member 16 in such positions as to engage in tapered slots in the angle iron 14. These slots are larger at the top than at the bottom so that after the assembly of the parts which are attached to the car body together with the angle iron 14 then the seat back cushion and its frame can be hung in the slots of 14 by the knobs 17. The seat back cushion with its frame and roller mechanism is supported by the spring 19 attached to the shaft pin of the lower roller 11.

In a construction of this kind where the seat back has an independent motion it is important that the friction and inertia of the seat back and its mechanism be so controlled and minimized as not to cause an unpleasant rubbing action on the passenger's back. It is also important that the up and down motion be obtained without sideways or rocking motion which would cause the passenger to have a feeling of unstability or insecurity. Our invention provides a satisfactory construction in all these respects. The anti-friction ball bearing rollers offer a minimum of static friction. The seat back mechanism is guided to prevent sideways movement by the one pair of rollers 11 rolling in the channel of the channel iron 9, so that other guides for this purpose (which might cause binding if not accurately aligned at considerable expense) need not be provided. We find that there is a minimum of unpleasant rubbing action on the passenger's back when the natural period of up and down oscillation of the seat back is as nearly as practicable equal to that of the up and down oscillation of the body of the passenger on the springy seat cushion. This is accomplished by selecting for the spring support of the seat back a spring or a system of springs which is of such stiffness as to give the seat back when oscillating by itself the same, or approximately the same, natural frequency of oscillation as the spring seat cushion when carrying its passenger load. Passengers vary in weight. The natural period of any given spring seat cushion when carrying its load will vary as the square root of the weight of the passenger. Therefore with a passenger weight changing from time to time the natural period of the seat cushion can not always be exactly equal to the natural period of the seat back, the natural period of which is constant. However we find approximate equality gives very comfortable results which are in marked contrast to the discomfort of the common rigidly supported seat back on rough roads. We find that the variation from equality is less objectionable when the spring supporting the seat back is stiffer than would be required for equality than if the spring is weaker than is required for equality. We therefore prefer to choose a spring which will make the natural periods equal with the lighter passengers. In the ordinary spring seat cushion as made for two or more passengers each portion of the cushion supports its passenger almost independently of the other portions. This is a desirable characteristic of such cushions as the springs can then be made of the proper stiffness for a single passenger without regard to the number of passengers to occupy the seat. In our invention it will be seen that we retain all the advantages of the common spring seat cushion construction and at the same time give the passengers the comfort of a seat back that moves with their bodies. Our invention can be applied in the space which is ordinarily vacant behind seat cushions so that it does not occupy any otherwise useful room.

While we have illustrated and described the preferred form of construction we do not wish to limit ourselves to the precise form shown, but desire to avail ourselves of such variations and modifications as come within the scope of the appended claims.

We claim:

1. A springy seat bottom, a seat back, guides for the seat back to limit the motion of the seat back to an approximately vertical up and down motion and spring support for the seat back independent of the springy seat bottom, said spring support being such that the natural period of free oscillation of the seat back on its spring support is approximately the same as the natural period of oscillation of the springy seat bottom with its passenger load.

2. A springy seat bottom, a seat back, guides for the seat back to limit the motion of the seat back to an approximately vertical up and down motion, one of said guides arranged to prevent all motion save an up and down motion parallel to itself and a rotation about itself as an axis, other guide or guides parallel to the first and in combination with the first preventing said rotation and suitably supporting the seat back against the pressure of the passenger's back but allowing free motion in all other directions and a spring support for the seat back independent of the seat bottom.

3. A springy seat bottom, a seat back, guides for the seat back to limit the motion of the seat back to an approximately vertical up and down motion, ball bearing rollers operating in said guides, one of said guides arranged to prevent all motion save an up and down motion parallel to itself and a rotation about itself as an axis, other guide or guides parallel to the first and in combination with the first preventing said rotation and suitably supporting the seat back against the pressure of the passenger's back but allowing free motion in all other directions and a spring support for the seat back of such stiffness that the seat back when set in motion free will oscillate up and down at approximately the same rate as the seat cushion with its passenger load when set in motion free.

4. A springy seat bottom, a seat back, spring support for the seat back independent of the springy seat bottom, guides for the seat back to limit the motion of the seat back to an approximately vertical up and down motion, said guides consisting of two or more master rollers operating against a single master guiding track, flanges for holding said master rollers to said master track, a track opposed to and parallel with said master track for preventing said master rollers from falling away from engagement with said master track, one or more auxiliary guide tracks parallel with the master track, rollers operating against said auxiliary tracks, said auxiliary tracks and rollers being without guiding flanges and placed so as to suitably support the seat back against the backward pressure of the passenger's back.

JAMES R. CRAVATH.
AUSTIN M. CRAVATH.